May 4, 1965    G. H. THOMAS ETAL    3,181,350

PORTABLE CLASSIFIER FOR UNBALANCE

Filed April 18, 1963

INVENTORS
ROBERT S. MORROW &
BY GLEN H. THOMAS

*Harry B. Keck*
ATTORNEY

United States Patent Office 3,181,350
Patented May 4, 1965

3,181,350
PORTABLE CLASSIFIER FOR UNBALANCE
Glen H. Thomas, Columbus, and Robert S. Morrow, Worthington, Ohio, assignors to International Research and Development Corporation, Worthington, Ohio, a corporation of Ohio
Filed Apr. 18, 1963, Ser. No. 273,935
2 Claims. (Cl. 73—71.2)

This invention relates to a portable, self-contained vibration level indicator.

More particularly, the invention concerns a vibration level indicator for use with a variable speed vibration source for sensing the vibration level of such sources at a specified frequency.

Background

In the manufacture of automobile engines, for example, the control of mechanical unbalance is a significant problem. Numerous systems have been developed for determining the existing mechanical unbalance in automotive engines. Corrective measures constitute an additional processing stage in the engine manufacturing sequence. Many of the manufactured engines possess only negligible unbalance which is well within commercial tolerances. Such engines do not require the additional corrective processing.

The present invention provides a portable, self-contained engine classifier which can be used by an operator to determine whether an automotive engine possesses mechanical unbalance in excess of acceptable tolerances. Through the use of the present engine unbalance classifier, needless unbalance measurements can be avoided for those engines which are inherently free of excessive unbalance.

The relation of engine unbalance to engine vibration does not remain constant at all speeds, but instead differs as the speed of the engine changes. Therefore in order to compare engines of the same type, it is desirable to observe the manifested unbalance (in the form of vibrations) at the same speed for all engines. Because there are numerous sources of vibration in an automotive engine in addition to the mechanical unbalance, it is further necessary to compare the engines at a uniform speed.

The present invention

This invention provides an engine classifier including a pick-up prod, a seismic electromagnetic transducer, a rectifier and voltage doubler circuit, a memory feature, a meter circuit and a sensitive micro-ammeter having a scale which can be calibrated according to the magnitude of mechanical vibration at the pick-up prod.

The seismic electromagnetic transducer has a resonating frequency at the frequency where vibration observations are desired. A preferred frequency for automotive engines is about 1500 cycles per minute is within the normal operating range. Such seismic electromagnetic transducers will comprise a rigid coil which is spring-mounted in a magnetic field. Vibratory movement of the magnetic field causes generation of an alternating electrical signal in the spring-mounted coil. The frequency of the generated signal corresponds with the frequency of vibration of the magnetic field. The amplitude of the electrical signal corresponds with the amplitude of mechanical vibration. Such seismic electromagnetic transducers are well known in the art. By proper selection of the springs and the weight of the suspended coil, the resonating frequency of the transducer can be adjusted.

The alternating electrical signal from the seismic electromagnetic transducer is applied to a rectifier and voltage doubler circuit which converts the generated signal to a direct current signal of approximately twice the input voltage. The voltage doubling circuit includes capacitors which accumulate a charge related to the applied voltage, i.e., related to the amplitude of mechanical vibration. The capacitors are so arranged as to retain the maximum charge which is applied across their terminals.

When required, the charge on the capacitors is discharged through a sensitive micro-ammeter which provides a measure of the charge, i.e., an indication of the magnitude of maximum vibration amplitude.

In operation the prod is positioned in direct and firm engagement with an automotive engine. The engine speed is increased (or decreased or both) through a spectrum of frequencies including the preselected speed where vibration measurement is desired. Preferably this desired frequency is about 1500 cycles per minute, a normal speed for automotive engines. Normally the operator will be able to determine from the engine sounds when the particular engine has passed through the selected speed frequency. It is not essential that the operator know the precise instant when the engine is passing through the selected speed. Nor is it essential for the engine to have a substantial predetermined dwell period at the selected speed.

After the engine has passed through the selected speed, the portable classifier is disengaged from contact with the engine and a reading button on the device is depressed to present a visual indication of the amplitude of mechanical vibration which occurred at the desired frequency.

Objects

The principal object of this invention is to provide a portable, self-contained vibration-level indicator having no dangling wires or cables and requiring no battery source of power.

A further object of this invention is to provide a vibration-level indicator for use with a variable speed source for sensing vibration-level at a specific frequency regardless of whether the operator knows the instant when the vibration source is at the designated frequency. That is, the vibration-level indicator has no critical speed adjustments nor does it require a substantial dwell period at the predetermined speed.

Another object is to provide a vibration-level indicator which will retain a maximum vibration indication for a significant period of time after the observation of such maximum indication in order to permit the operator to remove the indicator from the point of measurement to a more convenient point for reading by the operator.

A still further object of a specific embodiment of the invention is to provide a vibration-level indicator which is useful for determining vibration-levels at more than one point of a vibration source, for example, at the front end and at the rear end of an internal combustion engine.

These and other objects and advantages of the present invention will become apparent from the following detailed description by reference to the accompanying drawings in which.

URE 2 showing a specialized embodiment of the electrical circuitry of the present invention.

Figure 1:
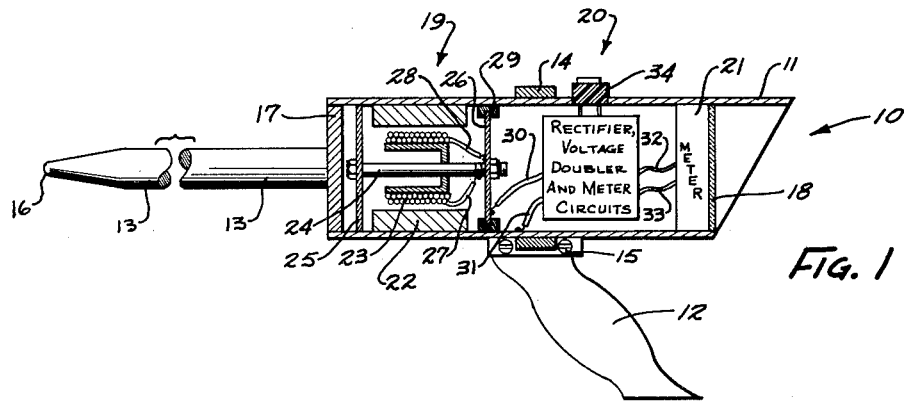
FIGURE 1 is a cross-section illustration of a preferred embodiment of the present vibration-level indicator.

Referring to FIGURE 1, it will be seen that the present vibration-level indicator, identified by the numeral 10, resembles a pistol. The indicator 10 includes a cylindrical casing 11, a pistol grip handle 12 and a forwardly extended prod 13. The pistol grip handle 12 may be bolted to a peripheral strap 14 by means of bolts 15 as shown. The prod 13 corresponds to that illustrated and described in U.S. Patent 2,753,948. The prod 13 has a forward tip 16 which is firmly positioned in abutment with a vibrating source such as an internal combustion engine. The tip 16 is held firmly against the vibrating source by the operator's manipulation of the pistol grip handle 12 and the casing 11. The prod 13 is rigidly secured to a circular bulkhead 17 which serves as a forward end sealing member of the cylindrical casing 11. Thus any vibration of the prod 13 is directly transmitted into the casing 11.

The rear portion of the cylindrical casing 11 is sealed off with a circular bulkhead 18 formed from transparent glass, plastic or the like to permit an operator to observe therethrough.

Figure 4:
FIGURE 4 is a plan view of a sensitive micro-ammeter showing the indicator needle and a typical calibration scale.

The interior of the cylindrical casing 11 includes a forward portion containing an electromechanical transducer 19, a central portion having electronic circuitry 20 and a rear portion comprising a sensitive micro-ammeter 21 having a meter dial of the type shown in FIGURE 4 which is viewable through the transparent bulkhead 18. The dial 50 may have a scale ranging from zero to full-scale, or may be marked with colors such as red and green to indicate whether the observed vibration-level is acceptable or not.

The transducer

The transducer 19 corresponds with many velocity-responsive seismic electromechanical transducers, such as that described in U.S. Patent 2,754,435. The transducer 19 includes a circular magnet 22 secured within the casing 11. A wound coil 23 is secured to a shaft 24 which is seismically mounted to a pair of diaphragm springs 25, 26. One end 27 of the coil conductor is grounded to the casing 11. The other end 28 of the coil conductor is connected to the diaphragm spring 26 which is electrically insulated from the casing by a suitable rim gasket 29 and also electrically insulated from the shaft 24 by suitable non-conducting washers.

As the casing 11 oscillates, the seismically mounted coil 23 is exposed to a moving magnetic field from the magnet 22. Thereby the coil 23 generates an alternating electrical signal having the same frequency as the vibrations of the casing 11 and having an amplitude corresponding to the amplitude of those vibrations.

Figure 3:
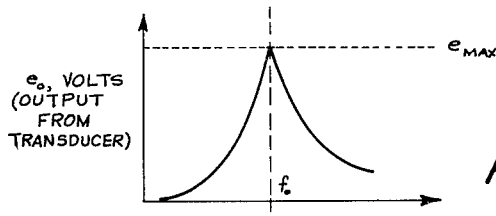
FIGURE 3 is a graphical representation of the response characteristics required in an electromagnetic transducer to accomplish the results of the present invention.

The diaphragm springs 25, 26 and the coil 23 and shaft 24 constitute a spring-mass system which has a resonating frequency $f_0$ determined by the physical constants of the system. By judicious selection of those physical constants, the resonating frequency $f_0$ may be made to coincide with the selected vibration frequency, e.g., about 1500 cycles per minute. Thus the transducer 19 will possess an output-frequency characteristic curve as shown in FIGURE 3. The voltage response $e_0$ for a constant amplitude applied vibration has a peak value $e_{max}$ at the resonating frequency $f_0$. Thus, by proper selection of the resonating frequency, the transducer itself will serve as a filter for eliminating all frequencies except the desired frequency as a significant factor in the output voltage signal $e_0$.

The output of the transducer 19 is delivered through conductors 30, 31 to a rectifier, voltage doubler and meter circuit 20. One conductor 30 is connected to the electrically conductive diaphragm spring 26 and the other conductor 31 is grounded to the casing 11. The output of the circuitry 20 is delivered through conductors 32, 33 to the micro-ammeter 21. A reading button 34 extends through the casing 11 to release the stored information from the device for visual presentation on the dial of the micro-ammeter 21.

Circuitry

Figure 2:
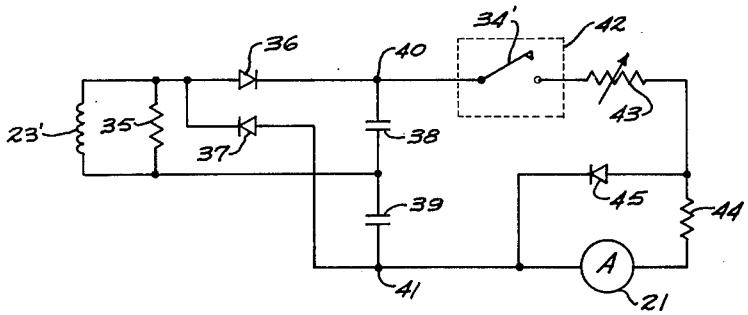
FIGURE 2 is a schematic illustration of the electrical circuitry of a preferred embodiment of the invention.

In FIGURE 2 the transducer coil is indicated by the numeral 23' and is shown to be connected across a damping resistor 35. The damping resistor 35 controls the output response curve of the resonating transducer 19 by holding the instantaneous values of $e_0$. The damping resistor 35 avoids the need for substantial dwell time at the selected frequency. Thus the transducer 19 and the damping resistor 35 together serve to develop a peak voltage output at the desired frequency regardless of the time that the vibration source is oscillating at that frequency.

Rectifier and voltage doubler

The output $e_0$ of the transducer 19 is delivered to a voltage rectifying and doubling circuit comprising a pair of diodes 36, 37 and a pair of identical capacitors 38, 39. The diodes 36, 37 allow unidirectional flow of current and serve to charge the capacitors 38, 39 each with a potential corresponding to $e_0$. As a consequence, the potential across the terminals 40, 41 corresponds to about twice the value of the maximum value of $e_0$ which is developed by the coil 23'. Where the vibration source passes through the frequency $f_0$, the potential across the terminals 40, 41 corresponds to the actual vibration occurring at the frequency $f_0$.

The terminals 40, 41 are connected across a normally open meter circuit which includes a normally open switch 42, a potentiometer 43, a fixed resistor 44 and the micro-ammeter 21. Because the meter circuit is normally open, the capacitors 38, 39 retain the maximum charge which is applied across the terminals 40, 41. The diodes 36, 37 prevent discharge of the capacitors 38, 39 except through the meter circuit.

Thus the capacitors 38, 39 possess a memory feature. That is, the potential across the treminals 40, 41 corresponds with the highest value of $e_0$ which was developed during the vibration measurement. If the vibration measurement occurred while the vibration source passed through the frequency $f_0$, then the charge across the terminals 40, 41 corresponds to $e_{max}$ for the actual magnitude of vibration then existing. That charge remains across the terminals 40, 41 until the normally open switch 42 is closed by depressing the switch arm 34' (corresponding to the reading button 34). Thereupon the charge is delivered through the micro-ammeter 21 and the resistors 43, 44. The meter 21 is adapted to rise quickly to an indicated value, to dwell at that value for about three seconds and then gradually to decrease to zero reading, thereby permitting accurate reading of the indication. Such damped meters are commercially available and usually have a resistance connected internally of the meter housing across the terminals for damping purposes.

By selecting low leakage silicon diodes 36, 37, the "memory feature" will exist for a sufficient period of time to permit convenient observation of the meter indication. Eventually, of course, the charge on the capacitors 38, 39 will leak away. However, in a typical device of this invention, the observed error in meter reading after a delay of five minutes (between the test and the meter reading) was only about 2 percent.

The microammeter 21 is further protected by a silicon diode 45 which is connected across the meter 21 and the resistor 44. The diode 45 is adapted to be non-conducting at low applied potentials, but to be highly conductive at higher applied potentials above a preselected threshold potential. The threshold potential is selected at about twice the full scale meter current. Thus if a surge current materializes, the diode 45 instantly becomes conductive and effectively shunts the surge current around the meter 21.

Alternative embodiment

Figure 5:
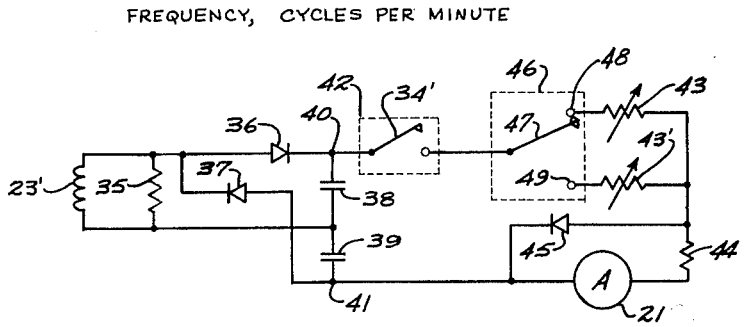
FIGURE 5 is a schematic illustration similiar to FIG-

The embodiment of the electrical circuitry of FIGURE 5 differs from that of FIGURE 2 by the addition of a second potentiometer 43' and a two-position switch 46 having a switch-arm 47 and two terminals 48, 49. The two potentiometers 43, 43' are separately adjusted for a desired response indication on the meter 21 according to the point on the vibration source where the prod tip 16 is engaged. The two-position switch 46 typically is a front-rear-selection switch.

In an internal combustion engine, for example, the vibration amplitude at a frontward point differs from the simultaneous vibration amplitude at a rearward point. For each unit of a particular type of engine, the front-to-rear variation will be the same. Hence two potentiometer settings (front and rear) can be applied to the potentiometers 43, 43' for all engine units of this type.

The switch arm 47 will be engaged with the terminal 48 when measurements are taken with respect to one point and will be engaged with the terminal 49 when measurements are taken with respect to the other point.

Operation

The prod tip 16 is engaged with the vibration source, e.g., an internal combustion engine. The engine speed is adjusted (a) up through; (b) down through; or (c) both up and down through a spectrum of speeds which includes the desired speed, e.g., 1500 cycles per minute. Thereafter the classifier is withdrawn to a convenient location. The reading button 34 is pressed and the meter is read. The same operation is carried out for the front and rear of the engine.

Prior art

In U.S. Patent 3,023,613 there is illustrated and described an engine classifier intended for similar end uses, i.e., to observe and indicate vibration amplitude of a vibration source. That device, however, required an engine unbalance meter and a speed indicating meter. A cable connection to the engine is required to drive the speed indicator. The operator "reads" the unbalance indicator only when the speed indicator meter reveals that the engine is operating at the selected speed. The device of the prior art has no "memory feature," but instead, must be observed at the moment of the test. Copending application S.N. 85,595, filed January 30, 1961, is a division of the aforesaid U.S. Patent 3,023,613.

We claim:
1. A portable engine unbalance classifier comprising: a portable casing containing:
   a transducer resonant to a selected frequency of vibration to be classified, said transducer being adapted to vibrate in harmony with a vibration source as the said vibration source changes speed through a spectrum of frequencies including the said selected frequency, and to deliver an alternating electrical signal corresponding in frequency with the said vibration source and having an amplitude corresponding with the amplitude of the said vibration source;
   a pair of transducer terminals to which the said transducer signal is delivered;
   three circuits connected in parallel with each other across the said transducer terminals as follows:
   a first circuit comprising a damping resistor;
   a second circuit comprising in series a first rectifier diode, a first output terminal and a first capacitor;
   a third circuit comprising in series a second rectifier diode, a second output terminal and a second capacitor;
   a meter circuit connected between the said first and second output terminals and comprising in series an ammeter and a normally open switch;
   the said first and second capacitor being connected in series between the said first and second output terminals;
   the anode of said first rectifier diode and the cathode of the said second rectifier diode being connected to the same one of said transducer terminal;
   whereby the said two capacitors develop additive charges and hold a charge which is approximately double the direct current equivalent of the highest amplitude of the said alternating signal; and
   whereby the said capacitors discharge through the said ammeter when the said normally open switch is closed to present an indication of the amplitude of vibration at the said frequency of vibration.
2. The classifier of claim 1, wherein the said meter circuit includes in series with the said ammeter and the said normally open switch the following:
   a two-position selector switch having a switch arm connected to said circuit and a pair of switch contacts;
   the first of said contacts being connected to a first resistor and in turn to the said current; the second of said contacts being connected to a second resistor and in turn to the said circuit;
   whereby, by positioning the said switch arm in engagement with the said first or second contact, the said first or second resistor respectively may be introduced into the said meter circuit in series with the said ammeter and the said normally open switch.

References Cited by the Examiner
UNITED STATES PATENTS

| | | | |
|---|---|---|---|
| 2,300,198 | 10/42 | Brown | 73—71.4 |
| 2,877,418 | 3/59 | Eldridge | 324—103 |
| 2,924,769 | 2/60 | Harriman | 324—103 |
| 3,094,862 | 6/63 | Burk | 73—23.1 |
| 3,098,379 | 7/63 | Crawford | 73—71.4 |

RICHARD C. QUEISSER, *Primary Examiner.*

JAMES J. GILL, *Examiner.*